(12) United States Patent
Chun et al.

(10) Patent No.: US 8,526,416 B2
(45) Date of Patent: Sep. 3, 2013

(54) METHOD OF PERFORMING POLLING PROCEDURE IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 12/452,495

(22) PCT Filed: Sep. 12, 2008

(86) PCT No.: PCT/KR2008/005424
§ 371 (c)(1),
(2), (4) Date: Jan. 5, 2010

(87) PCT Pub. No.: WO2009/035300
PCT Pub. Date: Mar. 19, 2009

(65) Prior Publication Data
US 2010/0118857 A1    May 13, 2010

Related U.S. Application Data

(60) Provisional application No. 60/971,921, filed on Sep. 13, 2007, provisional application No. 60/973,442, filed on Sep. 18, 2007, provisional application No. 60/983,304, filed on Oct. 29, 2007, provisional application No. 61/038,395, filed on Mar. 20, 2008.

(30) Foreign Application Priority Data

Sep. 11, 2008    (KR) .................... 10-2008-0089718

(51) Int. Cl.
*H04J 3/16* (2006.01)
(52) U.S. Cl.
USPC .................... 370/346; 370/342; 455/412.2
(58) Field of Classification Search
USPC ..................................................... 370/346
See application file for complete search history.

(56) References Cited

U.S. PATENT DOCUMENTS 5,878,041 A    3/1999  Yamanaka et al.
6,445,917 B1   9/2002  Bark et al.
(Continued)

FOREIGN PATENT DOCUMENTS

CN    1339903    3/2002
CN    1390425    1/2003
(Continued)

OTHER PUBLICATIONS

Wang et al., U.S. Appl. No. 60/976,139.
(Continued)

*Primary Examiner* — Pao Sinkantarakorn
*Assistant Examiner* — Richard K Chang
(74) *Attorney, Agent, or Firm* — McKenna Long & Aldridge LLP

(57) ABSTRACT

A method of performing a polling procedure in a wireless communication system is disclosed. In a method of performing polling procedure in a protocol layer in a wireless communication system, wherein the protocol layer performs a data retransmission function, the method comprises triggering a polling procedure to request a receiving side to transmit a status report, and terminating the triggered polling procedure if a predetermined event occurs.

8 Claims, 9 Drawing Sheets

(56) References Cited

U.S. PATENT DOCUMENTS

| | | |
|---|---|---|
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergström et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parvall et al. |
| 2004/0148396 A1* | 7/2004 | Meyer et al. .................. 709/227 |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim et al. |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1* | 7/2005 | Vayanos et al. ............. 370/235 |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz et al. |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus et al. |
| 2007/0081513 A1 | 4/2007 | Torsner |
| 2007/0091810 A1 | 4/2007 | Kim et al. |
| 2007/0097913 A1* | 5/2007 | Hanov .......................... 370/329 |
| 2007/0117579 A1 | 5/2007 | Cai et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |

| | | | | | | |
|---|---|---|---|---|---|---|
| 2008/0233940 | A1 | 9/2008 | Jen | JP | 2006-121562 A | 5/2006 |
| 2008/0233941 | A1 | 9/2008 | Jen | JP | 2006-311543 | 11/2006 |
| 2008/0261581 | A1 | 10/2008 | Cai | JP | 2007-116639 | 5/2007 |
| 2008/0268878 | A1 | 10/2008 | Wang et al. | JP | 2007-312244 A | 11/2007 |
| 2008/0273482 | A1 | 11/2008 | Lee et al. | JP | 2008-520125 A | 6/2008 |
| 2008/0273610 | A1 | 11/2008 | Malladi et al. | JP | 2009-513058 | 3/2009 |
| 2008/0305819 | A1 | 12/2008 | Chun et al. | JP | 2009-521893 | 6/2009 |
| 2008/0310395 | A1 | 12/2008 | Kashima | KR | 10-2001-0045783 | 6/2001 |
| 2008/0318578 | A1 | 12/2008 | Worrall | KR | 10-2001-0062306 | 7/2001 |
| 2009/0005058 | A1 | 1/2009 | Kazmi et al. | KR | 10-2002-0004645 | 1/2002 |
| 2009/0016301 | A1 | 1/2009 | Sammour et al. | KR | 10-2003-0012048 | 2/2003 |
| 2009/0041240 | A1 | 2/2009 | Parkvall et al. | KR | 10-2002-0097304 | 12/2002 |
| 2009/0046631 | A1 | 2/2009 | Meylan et al. | KR | 10-2003-006055 | 7/2003 |
| 2009/0046667 | A1 | 2/2009 | Pelletier et al. | KR | 10-2003-0068743 | 8/2003 |
| 2009/0046695 | A1 | 2/2009 | Jiang | KR | 10-2003-0087914 A | 11/2003 |
| 2009/0104890 | A1 | 4/2009 | Wang et al. | KR | 10-2004-0034398 | 4/2004 |
| 2009/0116434 | A1 | 5/2009 | Lohr et al. | KR | 10-2004-0039944 | 5/2004 |
| 2009/0119564 | A1 | 5/2009 | Sagfors et al. | KR | 10-2004-0072961 | 8/2004 |
| 2009/0156194 | A1 | 6/2009 | Meylan | KR | 10-2005-0022988 | 3/2005 |
| 2009/0175163 | A1 | 7/2009 | Sammour et al. | KR | 10-2005-0062359 | 6/2005 |
| 2009/0175253 | A1 | 7/2009 | Wu et al. | KR | 10-2005-0081836 | 8/2005 |
| 2009/0190480 | A1 | 7/2009 | Sammour et al. | KR | 10-2005-0092874 | 9/2005 |
| 2009/0232076 | A1 | 9/2009 | Kuo | KR | 10-2005-0099472 | 10/2005 |
| 2009/0259908 | A1 | 10/2009 | Gollapudi | KR | 10-2005-0100882 | 10/2005 |
| 2009/0305712 | A1 | 12/2009 | Franceschini et al. | KR | 10-2005-0127 A | 10/2005 |
| 2010/0014466 | A1 | 1/2010 | Meyer et al. | KR | 10-2006-0004935 | 1/2006 |
| 2010/0091750 | A1 | 4/2010 | Lee et al. | KR | 10-2006-0014910 | 2/2006 |
| 2010/0128648 | A1 | 5/2010 | Lee et al. | KR | 10-2006-0029452 | 4/2006 |
| 2010/0142429 | A1 | 6/2010 | Yi et al. | KR | 10-2006-0042858 | 5/2006 |
| 2010/0142457 | A1 | 6/2010 | Chun et al. | KR | 10-2006-0069378 | 6/2006 |
| 2010/0157904 | A1 | 6/2010 | Ho et al. | KR | 10-2006-0079784 | 7/2006 |
| 2010/0172282 | A1 | 7/2010 | Zhang et al. | KR | 10-2006-0090191 | 8/2006 |
| 2010/0232335 | A1 | 9/2010 | Lee et al. | KR | 10-2006-0134058 | 12/2006 |
| 2010/0260140 | A1 | 10/2010 | Zhu | KR | 10-2007-0048552 | 5/2007 |
| 2011/0019604 | A1 | 1/2011 | Chun et al. | KR | 10-2007-0076374 | 7/2007 |
| 2011/0033048 | A1 | 2/2011 | Stanwood et al. | KR | 10-0907978 | 7/2009 |
| | | | | KR | 10-2009-0084756 | 8/2009 |

FOREIGN PATENT DOCUMENTS

| | | |
|---|---|---|
| CN | 1396780 | 2/2003 |
| CN | 1549610 | 11/2004 |
| CN | 1613210 | 5/2005 |
| CN | 1642067 | 7/2005 |
| CN | 1761260 | 4/2006 |
| CN | 1761356 | 4/2006 |
| CN | 1846365 | 10/2006 |
| CN | 1868157 | 11/2006 |
| CN | 1918825 | 2/2007 |
| CN | 1938969 | 3/2007 |
| CN | 1954521 A | 4/2007 |
| CN | 1997227 | 7/2007 |
| CN | 101047966 A | 10/2007 |
| CN | 101090281 | 12/2007 |
| EP | 1263160 | 12/2002 |
| EP | 1326397 | 7/2003 |
| EP | 1 343 267 | 9/2003 |
| EP | 1 508 992 | 2/2005 |
| EP | 1 509 011 A2 | 2/2005 |
| EP | 1638237 | 3/2006 |
| EP | 1 689 130 | 8/2006 |
| EP | 1 695 462 A1 | 8/2006 |
| EP | 1 746 855 | 1/2007 |
| EP | 1768297 A2 | 3/2007 |
| EP | 1 796 405 | 6/2007 |
| EP | 2026523 | 2/2009 |
| EP | 2108223 | 10/2009 |
| JP | 07-162948 | 6/1995 |
| JP | 2000-324161 | 11/2000 |
| JP | 2001-197021 | 7/2001 |
| JP | 2002-198895 A | 7/2002 |
| JP | 2003-018050 | 1/2003 |
| JP | 2003-115796 | 4/2003 |
| JP | 2003-115876 | 4/2003 |
| JP | 2003-516021 | 5/2003 |
| JP | 2003-229925 | 8/2003 |
| JP | 2003-283592 | 10/2003 |
| JP | 2005-73276 A | 3/2005 |
| JP | 2006-054718 | 2/2006 |
| JP | 2006-505209 | 2/2006 |
| JP | 2006-514466 | 4/2006 |
| RU | 2291594 C2 | 1/2007 |
| RU | 2304348 | 8/2007 |
| TW | 496058 | 7/2002 |
| WO | WO 01/37473 | 5/2001 |
| WO | WO 01/39386 A1 | 5/2001 |
| WO | WO 03/045103 | 5/2003 |
| WO | WO 2004/042953 A1 | 5/2004 |
| WO | WO 2004/042963 | 5/2004 |
| WO | WO 2005/039108 | 4/2005 |
| WO | WO 2005/078967 A1 | 8/2005 |
| WO | WO 2005/079105 | 8/2005 |
| WO | WO 2005/122441 A1 | 12/2005 |
| WO | WO 2005/125226 | 12/2005 |
| WO | WO 2006/009714 | 1/2006 |
| WO | WO 2006/016785 | 2/2006 |
| WO | WO 2006/033521 | 3/2006 |
| WO | WO 2006/046894 | 5/2006 |
| WO | WO 2006/052086 | 5/2006 |
| WO | WO 2006/083149 | 8/2006 |
| WO | WO 2006/095385 | 9/2006 |
| WO | WO 2006/104335 | 10/2006 |
| WO | WO 2006/104342 | 10/2006 |
| WO | WO 2006/116620 | 11/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |
| WO | WO 2007/024065 | 3/2007 |
| WO | WO 2007/039023 | 4/2007 |
| WO | WO 2007/045505 | 4/2007 |
| WO | WO 2007/052900 | 5/2007 |
| WO | WO 2007/052921 | 5/2007 |
| WO | WO 2007/066900 | 6/2007 |
| WO | WO 2007/078142 | 7/2007 |
| WO | WO 2007/078155 A2 | 7/2007 |
| WO | WO 2007/078156 | 7/2007 |
| WO | WO 2007/078164 | 7/2007 |
| WO | WO 2007/078173 | 7/2007 |
| WO | WO 2007/078174 A1 | 7/2007 |
| WO | WO 2007/079085 | 7/2007 |
| WO | WO 2007/089797 | 8/2007 |
| WO | WO 2007/091831 A2 | 8/2007 |

| | | |
|---|---|---|
| WO | WO 2007/126793 | 11/2007 |
| WO | WO 2007-078174 A1 | 12/2007 |
| WO | WO 2007/147431 | 12/2007 |
| WO | WO 2008/004725 A1 | 1/2008 |
| WO | WO 2008/010063 | 1/2008 |
| WO | WO 2008/094120 | 8/2008 |
| WO | WO 2009/035301 | 3/2009 |

OTHER PUBLICATIONS

Sammour et al. U.S. Appl. No. 61/019,058.
LG Electronics Inc: "UE State Transition in LTE_ACTIVE", 3 GPP TSG-RAN WG2 #52; Athens, Greece; Mar. 2006.
Texas Instruments: "UL Synchronization Management and Maintenance in E-UTRA"; Kobe, Japan; May 2007.
Texas Instruments: "UL Synchronization Management in LTE_ACTIVE"; St. Julians, Malta; Mar. 2007.
Motorola: "Contention-Free Intra-LTE Handover"; St. Louis, USA; Feb. 2007.
Ericsson: "Scheduling Request in E-UTRAN"; Sorrento, Italy; Jan. 2007.
Reuven Cohen: "An Improved SSCOP-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.
Nokia: "Buffer reporting for E-UTRAN", vol. R2-060829, pp. 1-5, XP002503218.
"Uplink Scheduling for VoIP", No. R2-070476, Feb. 12, 2007, pp. 1-15, XP008125208.
Ghosh et al., "Random Access Design for UMTS Air-Interface Evolution", Vehicular Technology Conference, Apr. 2007, pp. 1041-1045.
Abeta et al., "Super 3G Technology Trends. Part 2: Research on Super 3G Technology", NTT Docomo Technical Journal, vol. 8, No. 3, Dec. 2006, pp. 55-62.
Nokia, "System Information Distribution", 3GPP TSG-RAN WG2 Ad Hoc Meeting on LTE, R2-061487, Jun. 2006.
LG Electronics, "Delivery of LTE System Information", 3GPP TSG-RAN WG2 Ad Hoc Meeting on LTE, R2-061959, Jun. 2006.
NEC, "Optimised buffer status reporting", 3GPP TSG-RAN WG2 #58bis, R2-072515, Jun. 2007.
Catt, Ritt, "Consideration on UL Buffer Reporting", 3GPP TSG-RAN WG2 #55, R2-062935, Oct. 2006.
R2-074691; Ericsson, Nokia Corporation, Nokia Siemens Networks, Qualcomm Europe, Samsung, NTT DoCoMo, Inc. "Framework for Scheduling Request and Buffer Status reporting", Nov. 5-9, 2007, TSG-RAN WG2 Meeting #60.
R1-063046; Motolola, "Syncronized Random Access Channel and Scheduling Request", Nov. 6-10, 2006, 3GPP TSG RAN1 #47.
R2-062350; Ericsson, "Basic Principles for the Scheduling Request in LTE", Aug. 28-Sep. 1, 2006, 3GPP TSG RAN WG2 #54.
R1-063301; NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47.
LG Electronics Inc. "Correction of status report coding", 3GPP TSG RAN WG2 #61, Feb. 11-15, 2008, Sorrento, Italy, XP-002624626.
3rd Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.
Alcatel-Lucent: "PDCP status report carrying LIS only", 3GPP TSG RAN WG2 #61, Jan. 14-18, 2008, Sevilla, Spain, XP-50138711.
Qualcomm Europe: "Further Details on RACH Procedure", 3GPP TSG-RAN WG1 #48, Feb. 12-16, 2007, St. Louis, Missouri, R1-070649.
NTT DoCoMo, Inc. "Buffer Status Report and Scheduling Request triggers", 3GPP TSG RAN WG2 #59, Aug. 20-24, 2007, Athens, Greece, R2-072574.
"Correction to PDCP Status Report", 3GPP TSG RAN WG2 #61bis, Mar. 24, 2008, R2-081594, XP-002624627.
ZTE: "redundant retransmission restraint in RLC-AM", 3GPP Draft; R2-061234, 3rd Generation Partnership Project (3GPP), Mobile Competence Centre; 650, Route Des Lucioles; F-06921 Sophia-Antipolis Cedex; France, vol. RAN WG2, no. Shanghai, China; 20060503, May 3, 2006, XP050131180.
"Digital cellular telecommunications system (Phase2+); Fuctional stage 2 description of Location Services (LCS) in GERAN (3GPP TS 43.059 version 7.3.0 release 7); ETSI TS 143 059" ETSI Standards, Lis, Sophia Antipolis Cedex, France, vol. 3-G1, No. V7.3.0, May 1, 2007, XP014038519.
3GPP TS 36.322, V8.0.0, Dec. 2007, 3rd Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short Status PDU", 3GPP TSG-RAN WG2 #62, May 5-9, 2008, Kansas City, Missouri, R2-082133.
Qualcomm Europe: "Scheduling request mechanism", 3GPP TSG-RAN WG1 #48bis, Mar. 30, 2007, R1-071276.
Texas Instruments: "Scheduling Request and DRX in E-UTRA", 3GPP TSG RAN WG1 #49bis, Jun. 29, 2007, R1-072859.
Nokia Siemens Networks: "Update on Security, System Information, Mobility, MAMS and DRX", 3GPP TSG-RAN2 Meeting #59, Aug. 31, 2007, R2-073863.
Ericsson: "SDU discard", 3GPP, Aug. 24, 2007, R2-073230.
ASUSTek, "Summary of HFN de-synchronization problem off-line email discussion", 3GPP TSG RAN WG2 #46 Tdoc R2-050318, Feb. 2005.
ASUSTek, "On-line recovery of HFN synchronization due to RLC UM SN problem", 3GPP TSG-RAN WG2 Meeting #44 R2-041940, Oct. 2004.
3GPP TS 36.321 E-UTRA MAC protocol specification, 3GPP TS 36.321 v1.0.0, Sep. 2007 RP-070689.
Motorola, "MAC Header format", 3GPP TSF RAN2, Meeting #59bis, Oct. 8-12, 2007, R2-074419.
NTT DoCoMo et al. "MAC PDU structure for LTE", 3GPP TSG RAN WG2 #59 bis, Oct. 8-12, 2007, R2-074174.
3GPP TSG RAN WG2 #59bis LTE User Plane session report, 3GPP R2-074536, Oct. 12, 2007.
3GPP TS 25.321 Medium Access Control protocol specification, 3GPP TS25.321 v7.5.0, Jun. 2007.
ITRI, "Buffer Status Reporting with Group Combining for LTE", 3GPP TSG-RAN WG2, Meeting #58bis, Orlando, Florida, Jun. 25-29, 2007, R2-072833.
NEC, "Considerations on Scheduling Information", 3GPP TSG RAN WG2#59, Athens, Greece, Aug. 20-24, 2007, R2-073556.
LG Electronics Inc., "Correction to polling procedure", 3GPP TSG-RAN WG2 #61 bis, Mar. 31-Apr. 4, 2008, Shenzhen, China, R2-081588.
"Universal Mobile Telecommunications System (UMTS); Radio Link Control (RLC) protocol specification", ETSI TS 322, v4.10.0, Sep. 2003, Release 4.
LG Electronics, "Update of eUtran PDCP specification", 3GPP TSG-RAN2 Meeting #61, Sorrento, Italy, 2008, R2-081390.
Ericsson, "RLC status report format", TSG-RAN WG2 Meeting #60, Jeju Island, Korea, Nov. 5-9, 2007, R2-074701.
Jiang, ASUSTeK Computer Inc., "HFN de-synchronization detection with integrity protection scheme in a wireless communications system", U.S. Appl. No. 60/863,800.
Qualcomm Europe, "UL Requests", 3GPP TSG-RAN WG1 #47bis, Jan. 15-19, 2007, Sorrento, Italy, R1-070426.
Motorola, "Design of backoff scheme for LTE", 3GPP TSG-RAN-WG2 Meeting #56 bis, Sorrento, Italy, Jan. 15-19, 2007, R2-070143.
Alcatel-Lucent "Format for RACH Message 2", 3GPP TSG RAN WG2 #60bis, Sevilla, Spain, Jan. 14-18, 2008, R2-080176.
MAC Rapporteurs, "Change Request: E-UTRA MAC protocol specification update", 3GPP TSG RAN WG2 #60bis, Sevilla, Spain, Jan. 14-18, 2008, R2-080631.

NTT DoCoMo Inc., "Uplink synchronization maintenance", 3GPP TSG RAN WG2 #58, May 7-11, 2007, Kobe, Japan, R2-072014.

LG Electronics Inc., "Discussion on BCCH update", 3GPP TSG-RAN WG2 #58bis, Jun. 25-29, 2007, Orlando, FL, R2-072736.

Catt, "Notification scheme for system information change", 3GPP TSG-RAN WG2 #58, May 7-11, 2007, Kobe, Japan, R2-071870.

3GPP TS 36.321 V8.2.0 (May 2008), 3rd Generation Partnership Project; Technical Specification Group Radio Access Network; Evolved Universal Terrestrial Radio Access (E-UTRA) Medium Access Control (MAC) protocol specification (Release 8), Jun. 17, 2008.

3GPP TSG-RAN WG2 Meeting #67, Shenzhen, China, Aug. 24-28, 2009, R2-095152.

Qualcomm Europe, General Corrections to RLC, R2-011701, 3GPP, 20001-07-13.

LG Electronics Inc, Out-of-sequence problem in AM RLC: Discretely discarded SDUs, R2-011206, 3GPP, May 25, 2001.

\* cited by examiner

METHOD OF PERFORMING POLLING PROCEDURE IN A WIRELESS COMMUNICATION SYSTEM

This application claims the benefit of PCT/KR2008/005424, filed on Sep. 12, 2008, along with U.S. Provisional Application Ser. No. 60/971,921, filed Sep. 13, 2007, U.S. Provisional Application Ser. No. 60/973,442, filed Sep. 18, 2007, U.S. Provisional Application Ser. No. 60/983,304, filed Oct. 29, 2007, U.S. Provisional Application Ser. No. 61/038,395, filed Mar. 20, 2008, and Korean Patent Application No. 10-2008-0089718, filed Sep. 11, 2008, all of which are hereby incorporated herein by reference for all purposes in their entireties.

TECHNICAL FIELD

The present invention relates to a wireless communication system, and more particularly, to a method of performing a polling procedure in a wireless communication system.

BACKGROUND ART

Various types of data retransmission methods can be used to ensure certainty of data transmission to a receiving side in a wireless communication system. Particularly, the need to use a retransmission method increases when the receiving side should necessarily receive non-real time packet data such as signaling data or TCP/IP data.

An example of the data transmission method used in the wireless communication system will be described as follows. The receiving side transmits a status report to a transmitting side to report whether at least one or more data blocks transmitted from the transmitting side have been successfully received or not. The transmitting side retransmits data blocks which the receiving side has failed to receive, to the receiving side based on the status report. For application of the retransmission method, data which have been transmitted once should be stored in a buffer for a certain time period without discarding so as to prepare retransmission. Accordingly, transmission buffer and a retransmission buffer are required, wherein data which have never been transmitted to the receiving side are stored in the transmission buffer and data which have been transmitted to the receiving side but need to be on standby for retransmission are stored in the retransmission buffer.

The transmitting side can request the receiving side to transmit the status report. This procedure is referred to as a polling procedure. If the status report transmitted from the receiving side is lost during transmission or the receiving side does not transmit the status report to the transmitting side timely, the transmitting side can perform the polling procedure. Alternatively, the transmitting side can perform the polling procedure periodically.

DISCLOSURE OF THE INVENTION

The transmitting side should use additional radio resources to perform the polling procedure. Accordingly, for efficient use of radio resources, the polling procedure should be prevented from being used unnecessarily. Meanwhile, the transmitting side needs to prevent the buffer from being saturated due to retransmission standby by performing the polling procedure timely. To this end, reasonable and efficient criteria as to when the transmitting side should perform the polling procedure are required.

Accordingly, the present invention is directed to a method of performing a polling procedure in a wireless communication system, which substantially obviates one or more problems due to limitations and disadvantages of the related art.

An object of the present invention is to provide a method of performing a polling procedure in a wireless communication system, in which the polling procedure is performed while radio resources are being used efficiently.

Another object of the present invention is to provide a method of performing a polling procedure in a wireless communication system, in which a transmitting side performs the polling procedure timely to prevent communication from being broken off unexpectedly.

It is to be understood that the technical solutions to be achieved by the present invention will not be limited to the aforementioned description, and another technical solutions will be apparent to those skilled in the art to which the present invention pertains, from the following detailed description of the present invention.

In one aspect of the present invention, a method of performing polling procedure in a protocol layer performing a data retransmission function in a wireless communication system comprises triggering a polling procedure to request a receiving side to transmit a status report, and terminating the triggered polling procedure if a predetermined event occurs.

In another aspect of the present invention, a method of performing polling procedure in a protocol layer performing a data retransmission function in a wireless communication system comprises transmitting polling information to request a receiving side to transmit a status report for at least one data block transmitted from a transmitting side, and receiving the status report from the receiving side in response to the polling information at least two times or more.

In other aspect of the present invention, a method of performing polling procedure in a protocol layer performing a data retransmission function in a wireless communication system comprises checking status of a buffer the protocol layer, and triggering a polling procedure when a ratio of data stored in the buffer to maximum data that can be stored in the buffer exceeds a first reference value.

According to the present invention, radio resources can efficiently be used during the polling procedure, and the transmitting side can perform the polling procedure timely, whereby communication can be prevented from being broken off unexpectedly.

The advantages of the present invention will not be limited to the aforementioned description, and it is to be understood that advantages not described will be apparent to those skilled in the art to which the present invention pertains, from the description of the present invention.

BRIEF DESCRIPTION OF THE DRAWINGS

FIG. 3A and FIG. 3B are diagrams illustrating a structure of a radio interface protocol between a user equipment (UE) and E-UTRAN, in which FIG. 3A is a schematic view of a control plane protocol and FIG. 3B is a schematic view of a user plane protocol.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 1:
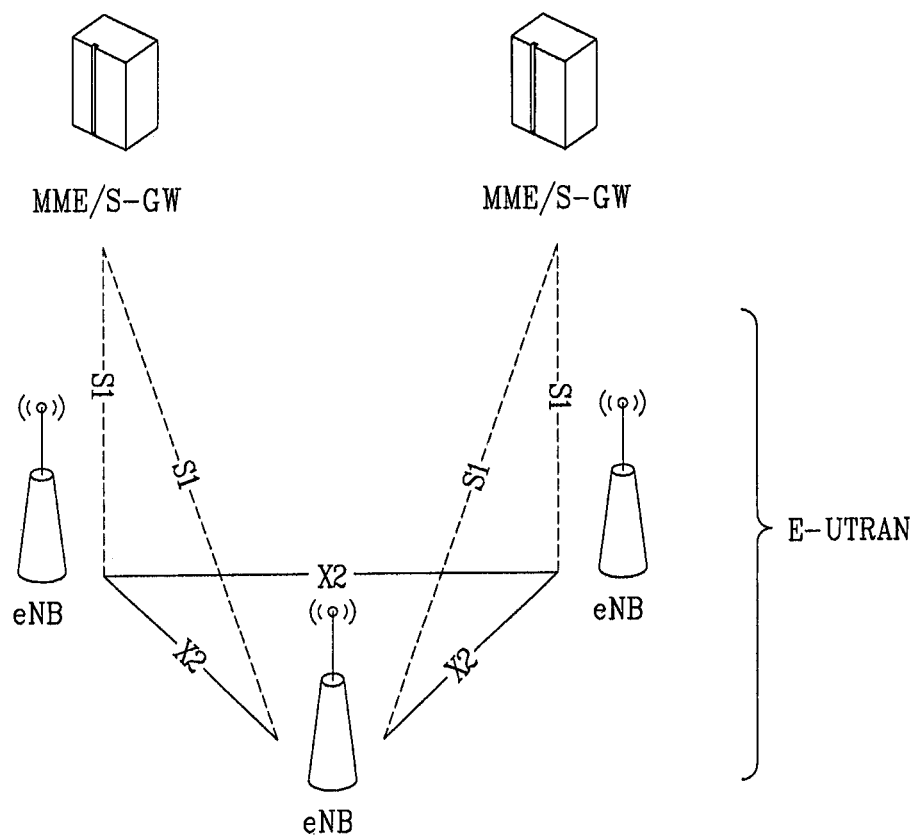
FIG. 1 is a diagram illustrating a network structure of an E-UMTS (Evolved Universal Mobile Telecommunications System).

FIG. 1 is a diagram illustrating a network structure of an E-UMTS. An E-UMTS is a system evolving from the conventional WCDMA UMTS and its basic standardization is currently handled by the 3GPP (3$^{rd}$ Generation Partnership Project). The E-UMTS can also be called an LTE (Long Term Evolution) system.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 2:
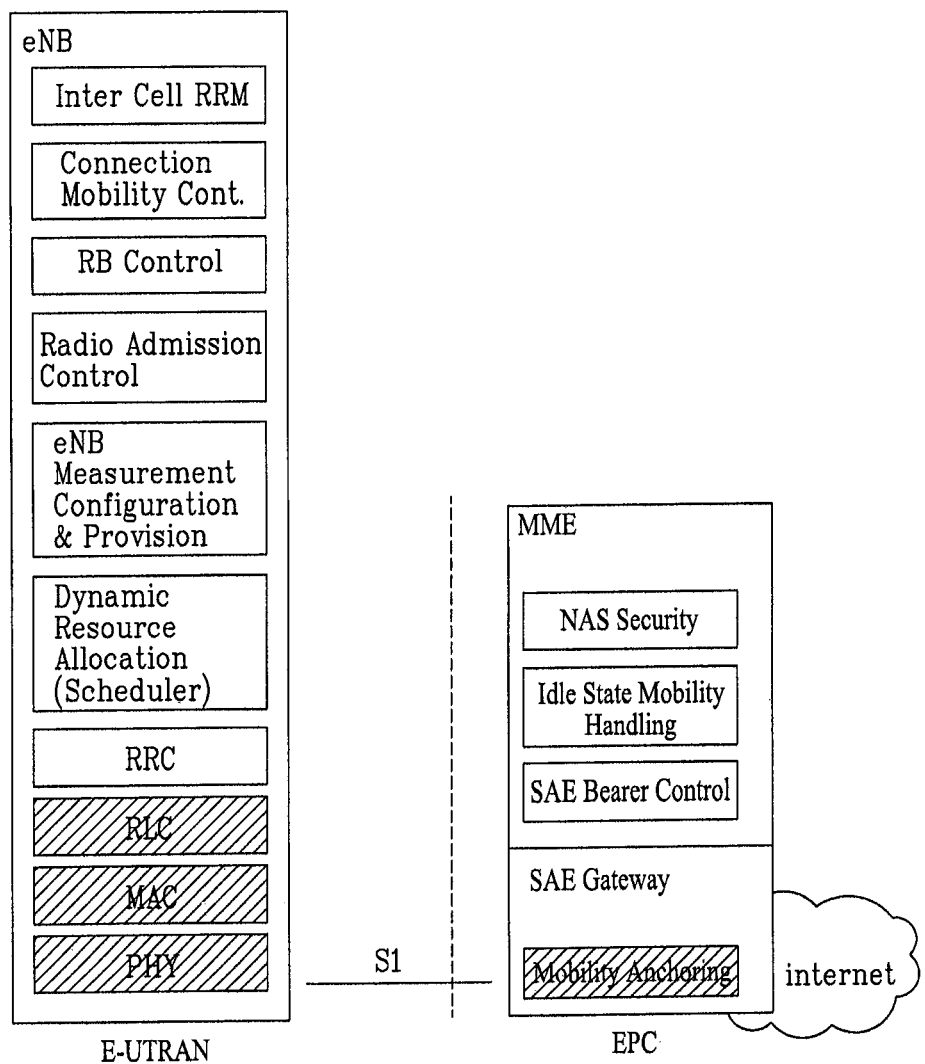
FIG. 2 is a schematic view illustrating an E-UTRAN (Evolved Universal Terrestrial Radio Access Network).

FIG. 2 is a schematic view illustrating an E-UTRAN (Evolved Universal Terrestrial Radio Access Network). In FIG. 2, a hatching part represents functional entities of a user plane, and a non-hatching part represents functional entities of a control plane.

Figure 3A:
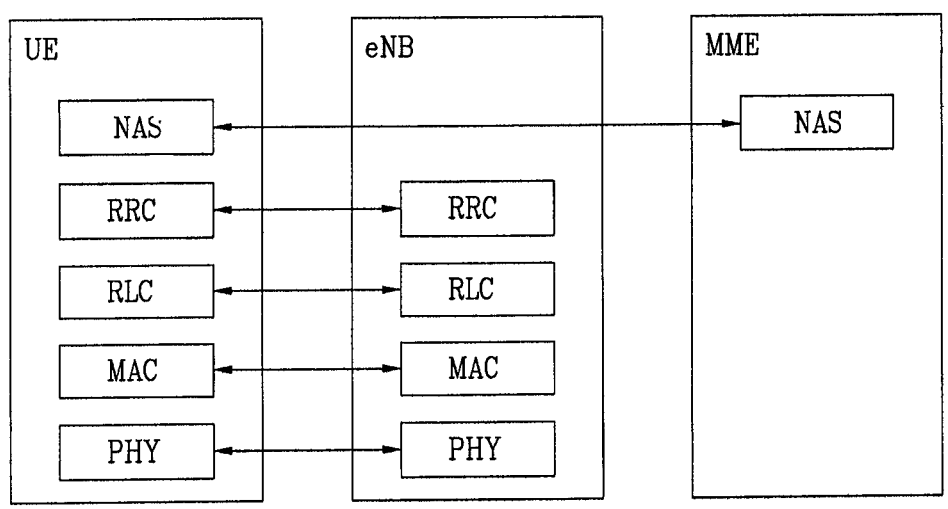
Figure 3B:
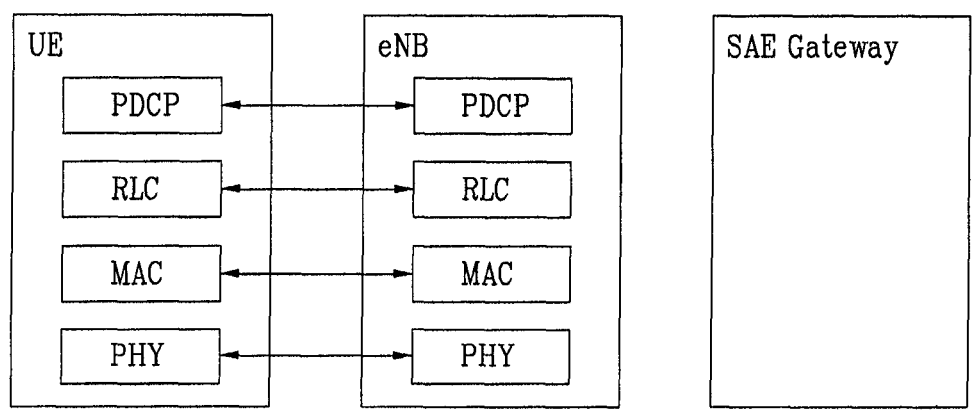

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer, and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels.

The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

Examples of downlink transport channels carrying data from the network to the user equipments include a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, examples of uplink transport channels carrying data from the user equipments to the network include a random access channel (RACH) carrying an initial control message and an uplink shared channel (UL-SCH) carrying user traffic or control message.

Examples of logical channels located above the transport channels and mapped with the transport channels include a broadcast control channel (BCCH), a paging control channel (PCCH), a common control channel (CCCH), a multicast control channel (MCCH), and a multicast traffic channel (MTCH).

As described above, the RLC layer of the second layer supports reliable data transfer. Also, the RLC layer serves to perform segmentation and/or concatenation for data received from its upper layer to control a size of a data block so that the lower layer can transmit the data block through a radio interface. Also, in order to ensure various quality of services (QoS) required by each radio bearer, the RLC layer of the second layer provides three types of operation modes, transparent mode (TM), un-acknowledged mode (UM), and an acknowledged mode (AM). Particularly, the AM RLC layer performs a retransmission function using an automatic repeat and request (ARQ) function for reliable data transmission. Hereinafter, the UM mode and the AM mode of the RLC layer will be described in more detail.

The UM RLC layer transmits PDUs (protocol data units) by adding a PDU header including a sequence number (hereinafter, abbreviated as "SN") to each PDU, so that the receiving side can identify what PDU has been lost during transmission. In accordance with this function, the UM RLC layer mainly serves to transmit broadcast/multicast data or real-time data such as voice (for example, VoIP) or streaming of a packet service domain (hereinafter, abbreviated as "PS domain") in a user plane. Also, the UM RLC layer serves to transmit an RRC message, which does not need acknowledgement, among RRC messages transmitted to a user equipment or a user equipment group within a cell, in a control plane.

Like the UM RLC layer, the AM RLC layer constitutes RLC PDUs by adding a PDU header including SN thereto. However, the AM RLC layer is different from the UM RLC layer in that the receiving side transmits reception acknowledgements in response to the PDUs transmitted from the transmitting side. The reason why the receiving side transmits reception acknowledgement in the AM RLC layer is to request the transmitting side to retransmit a PDU which the receiving side has not received. This retransmission function is a main feature of the AM RLC layer. Accordingly, the AM RLC layer is to ensure error-free data transmission through retransmission. For this reason, the AM RLC layer serves to transmit non-real time packet data such as TCP/IP of the PS domain in the user plane. Also, the AM RLC layer serves to transmit an RRC message, which necessarily requires reception acknowledgement, among the RRC messages transmitted to a user equipment within a cell, in the control plane.

In view of a directional aspect, the UM RLC layer is used for uni-directional communication whereas the AM RLC layer is used for bi-directional communication due to a feedback from the receiving side. The UM RLC layer is also different from the AM RLC layer in view of a structural aspect. Namely, although the UM RLC layer allows one RLC entity to perform a transmission function or a receiving function, the AM RLC layer allows both an entity performing a transmission function and an entity performing a receiving function to exist in one RLC entity.

The reason why that the AM RLC layer is complicated is caused by a retransmission function. For retransmission management, the AM RLC entity includes a retransmission buffer in addition to a transmission buffer and uses a transmission and reception window for flow control. The AM RLC entity of the transmitting side performs a polling procedure to request a peer RLC entity of the receiving side to transmit a status report, and the receiving side transmits the status report to the transmitting side to report reception acknowledgements. Also, the AM RLC entity performs a function constituting a status PDU to transfer the status report.

The AM RLC entity supports the aforementioned functions using a plurality of protocol parameters, status parameters, timers, etc. In the AM RLC layer, a PDU used to transmission of control data such as a status report or status PDU will be referred to as a control PDU, and a PDU used to transfer user data will be referred to as a data PDU.

As described above, the AM RLC entity of the transmitting side includes two buffers, i.e., a transmission buffer and a retransmission buffer. Data which have not yet been included in RLC PDU, among data transferred from an upper entity, are stored in the transmission buffer. An RLC PDU transferred to a lower entity is stored in the retransmission buffer until the receiving side acknowledges that the RLC PDU has been successfully received therein.

Figure 4:
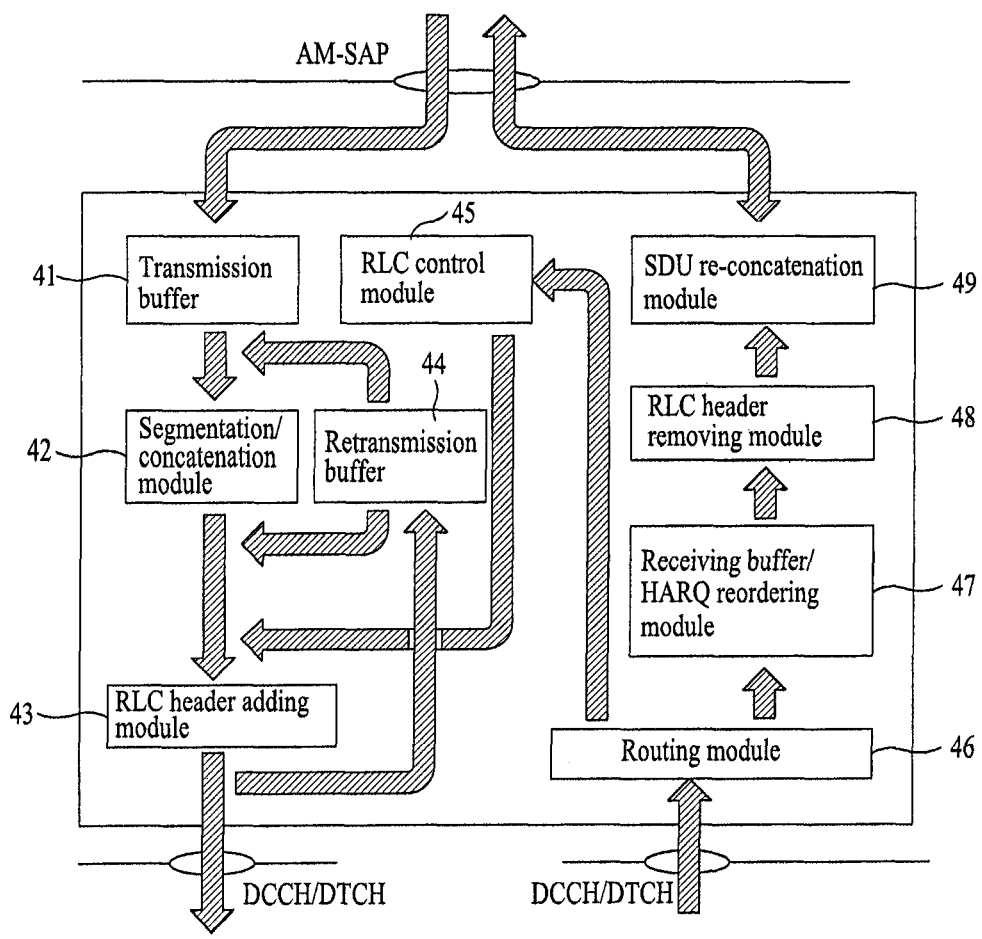
FIG. 4 is a diagram illustrating an example of a functional block of RLC AM entity.

FIG. 4 is a diagram illustrating an example of a functional block of the RLC AM entity.

Referring to FIG. 4, RLC SDU (Service Data Unit) transferred from an upper layer (RRC layer or PDCP sub-layer) is stored in a transmission buffer 41. A segmentation/concatenation module 42 performs segmentation and/or concatenation for at least one RLC SDU transferred from the transmission buffer 41. Segmentation and/or concatenation is performed at a specific transmission opportunity in accordance with a transport block size reported from a lower layer. As a result, an RLC PDU generated by the RLC AM entity can have a size desired by the lower layer. An RLC header adding module 43 adds an RLC header to a data block transferred from the segmentation/concatenation module 42, an RLC AMD PDU is generated as the RLC PDU header is added to the data block.

Figure 5:
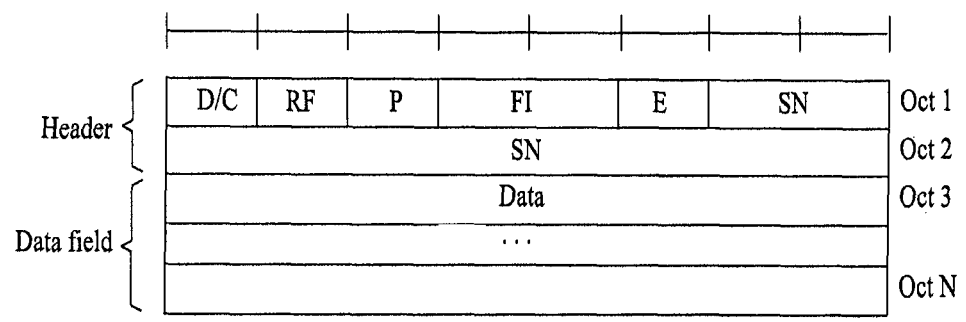
FIG. 5 is a diagram illustrating a basic structure of AMD PDU.

FIG. 5 is a diagram illustrating a basic structure of the AMD PDU. The AMD PDU includes a PDU header part and a data field part. The header can include a fixed part and an extended part, wherein the fixed part exists in every AMD PDU and the extended part is included in the AMD PDU when necessary. The extended part is included in the AMD PDU if one or more data field elements exist in the AMD PDU.

The fixed part includes a D/C field, re-segmentation flag (RF) field, polling (P) field, framing info (FI) field, extension bit (E) field and a sequence number (SN) field. The D/C field includes information identifying whether a corresponding AMD PDU is a data PDU or a control PDU. The RF field includes information indicating whether a corresponding RLC PDU is a single perfect AMD PDU or a part of the AMD PDU. The polling field includes information indicating whether the AM RLC entity of the transmitting side will request the peer AM RLC entity of the receiving side to transmit a status report. The FI field includes information indicating that the RLC SDU included in the AMD PDU has been segmented from a start part and/or an end part of the data field. The E field includes information indicating whether the data field starts behind the fixed part or whether an additional E field and an LI field follow behind the fixed part. The SN field includes a sequence number of the AMD PDU.

Referring to FIG. 4 again, the AMD PDU generated as the header is added by the RLC header adding module 43 is transferred to the lower layer, for example, the MAC layer. Before the AMD PDU is transferred to the lower layer, an additional procedure such as ciphering can be performed for the AMD PDU if necessary. The AMD PDU transferred to the lower layer is stored in the retransmission buffer 44 to perform a retransmission function.

If the RLC AM entity performs a receiving function, a routing module 46 performs routing for received RLC PDUs in accordance with a type of the RLC PDUs, so as to transfer control PDUs to an RLC control module 45 and AMD PDUs to a receiving buffer/HARQ reordering module 47. The receiving buffer/HARQ reordering module 47 stores the AMD PDUs transferred from the routing module 46, and aligns them in the order of SN if they are not received in the order of SN. An RLC header removing module 48 removes the RLC header from each AMD PDU and transfers the resultant data to an SDU re-concatenation module 49. The SDU re-concatenation module 49 re-concatenates at least one or more RLC SDUs using the data transferred from the RLC header removing module and then transfers the resultant data to the upper layer.

The RLC AM entity of the receiving side transfers a status report to the transmitting side using a status PDU to report whether the at least one or more RLC PDUs transmitted from the transmitting side have been successfully received.

Figure 6:
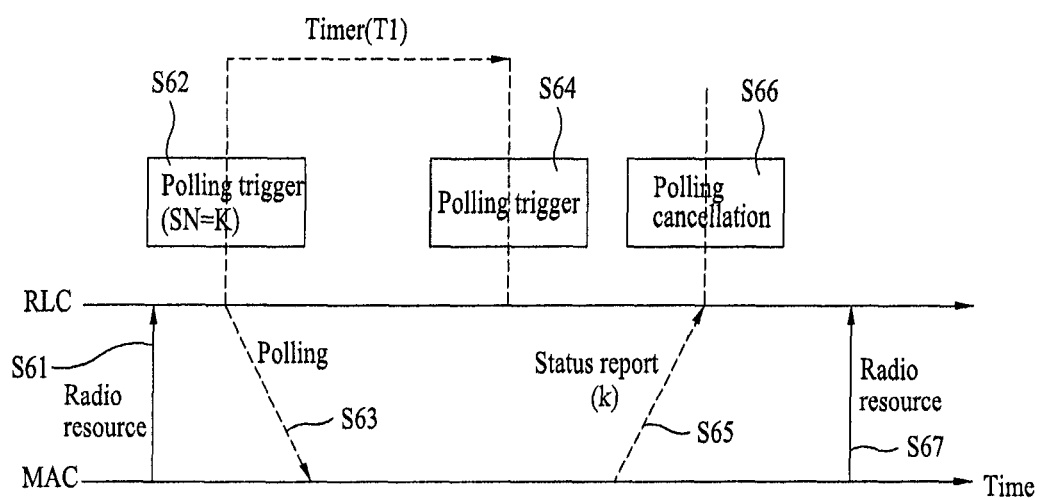
FIG. 6 is a flow chart illustrating a procedure according to one embodiment of the present invention.

FIG. 6 is a diagram illustrating one embodiment of the present invention. The embodiment of FIG. 6 relates to an example of canceling a triggered polling procedure if a predetermined event occurs in the transmitting side after the polling procedure is triggered. An example of the predetermined event includes a case where the transmitting side has received status report from the receiving side before transmitting a polling bit of the AMD PDU, which is set to "1", to the receiving side after determining to perform the polling procedure. In the embodiment of FIG. 6, it is assumed that the transmitting side is a user equipment (UE), and the receiving side is a base station (eNB).

Referring to FIG. 6, an RLC layer of the user equipment is reported from a MAC layer that uplink radio resources have been allocated [S61]. If the polling procedure is triggered [S62], the RLC layer sets a polling bit of a specific AMD PDU to a polling request bit, i.e., "1" and then transmits the AMD PDU to the eNB using the uplink radio resources [S63]. Examples of the status where the polling procedure can be triggered in the RLC layer includes the status where a polling period of periodic polling procedure comes after the RLC layer transmits last data stored therein to the receiving side and the status where a timer expires in case that the polling procedure is triggered on the timer base. FIG. 6 relates to an example of the polling procedure using the timer. In the polling procedure, the RLC layer stores a sequence number (K in FIG. 6) of an RLC PDU for which a reception acknowledgement is desired by the user equipment.

In a state that the RLC layer of the user equipment fails to receive the status report for the RLC PDU corresponding to the sequence number K, if the a certain status where the polling procedure can be triggered occurs, for example, if the timer (T1) expires, the RLC layer determines to perform the polling procedure [S64]. At this time, since there are no uplink radio resources allocated to the user equipment, the user equipment should be allocated with radio resources from the eNB to perform the polling procedure. Request and allocation of the radio resources are performed by the MAC layer, which may require much time.

In a state that the RLC layer is not allocated with radio resources for uplink data transmission after the polling procedure is triggered, the RLC layer receives a status report from the base station [S65]. If information of RLC PDU corresponding to the sequence number K is included in the status report, the RLC layer cancels the triggered polling procedure [S66]. In other words, if there is an AMD PDU to be transmitted to the eNB, the RLC layer sets a polling field of the AMD PDU to "0". If there is no AMD PDU to be transmitted to the eNB, the RLC layer does not transmit data to the eNB.

Figure 7:
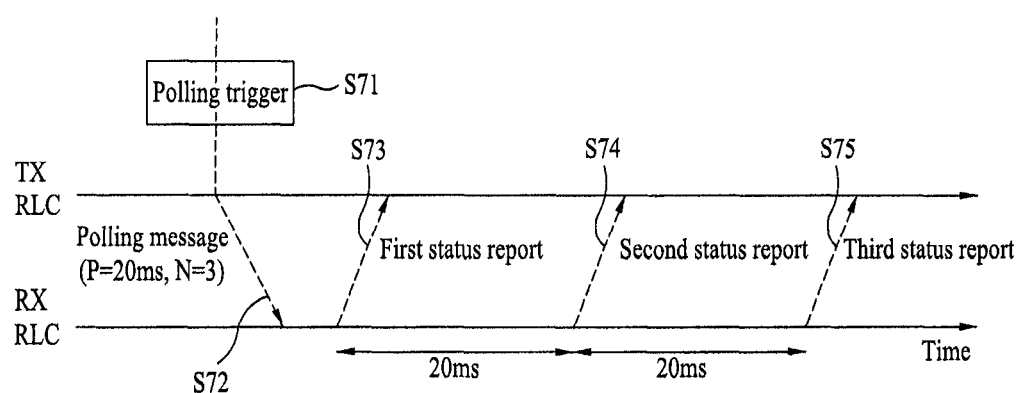
FIG. 7 is a diagram illustrating the embodiment of FIG. 6 in view of another aspect.

FIG. 7 is a diagram illustrating another embodiment of the present invention. According to the embodiment of FIG. 7, if a transmitting side performs a polling procedure once, a receiving side transmits a status report to the transmitting side as much as a plurality of number of times which are previously determined.

Referring to FIG. 7, during a call establishment procedure or a radio bearer establishment procedure, RLC layers of the transmitting side and the receiving side receive information related to the number of transmission times (N) and a transmission period (P) from RRC layers which are upper layers of the RLC layers, the transmission times (N) and the transmission period (P) used for repeatedly transmitting the status report from the receiving side to the transmitting side after the RLC layer of the transmitting side performs the polling procedure once. Alternatively, the transmitting side can transmit information related to the number of transmission times and the transmission period together with a polling message when transmitting the polling message to the receiving side. In the embodiment of FIG. 7, N is equal to 3 and P is equal to 20 ms. Meanwhile, the information related to the number of transmission times can be replaced with information related to a transmission duration. In this case, the receiving side transmits the status report to the transmitting side with the transmission period during the transmission duration.

When an event in which the RLC layer of the transmitting side should perform the polling procedure occurs, the polling procedure is triggered [S71]. If the polling procedure is triggered, the RLC layer of the transmitting side sets a polling field of an AMD PDU to "1" and transmits the AMD PDU to the receiving side [S72]. If the receiving side has not been informed of the number of transmission times and the transmission period, the information related to the number of transmission times and the transmission period is included in the AMD PDU. The RLC layer of the receiving side repeatedly transmits the status report to the transmitting side in accordance with the number of transmission times and the transmission period [S73]. In other words, the RLC layer of the receiving side transmits the status report to the transmitting side three times at an interval of 20 ms. Each of the status reports repeatedly transmitted to the transmitting side may include status report of different RLC PDUs.

Figure 8:
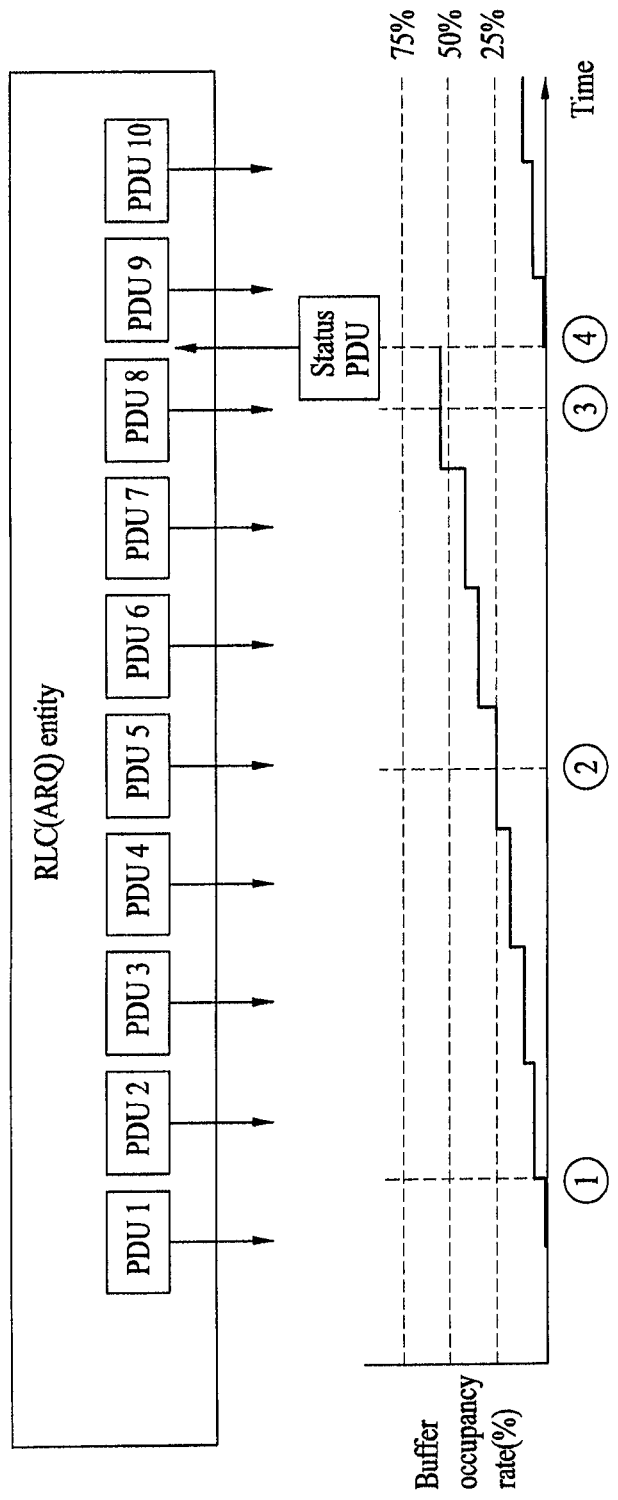
FIG. 8 is a diagram illustrating another embodiment of the present invention.

FIG. 8 is a diagram illustrating another embodiment of the present invention. According to the embodiment of FIG. 8, an RLC layer of a transmitting side performs a polling procedure in consideration for buffer status. The buffer status means at least one of a status of a transmission buffer and a status of a retransmission buffer. An example of the buffer status includes a buffer occupancy rate. The buffer occupancy rate means a ratio of data currently stored in the buffer to data that can be stored in the buffer with the maximum range. In this case, a buffer occupancy rate for each of the transmission buffer and the retransmission buffer of the RLC layer of the transmitting side or a buffer occupancy rate for both the transmission buffer and the retransmission buffer can be considered. In the embodiment of FIG. 8, the RLC layer performs the polling procedure at the time when the buffer occupancy rate reaches a value larger than a reference value (25%, 50%) which is previously determined, considering the buffer occupancy rate for the retransmission buffer.

Referring to FIG. 8, the RLC layer of the transmitting side sequentially transmits PDUs to the receiving side starting from PDU 1. The PDUs transmitted to the receiving side are stored in the retransmission buffer for retransmission. Since the buffer occupancy rate for the retransmission buffer exceeds the first reference value, i.e., 25% at the time when the RLC layer transmits PDU 5, the RLC layer sets a polling field of PDU 6 to "1" after triggering the polling procedure, and then transmits the PDU 6 to the receiving side. Since the buffer occupancy rate for the retransmission buffer exceeds the second reference value, i.e., 50% at the time when the RLC layer transmits PDU 8, the RLC layer performs the polling procedure. After transmitting the PDU 8, the RLC layer receives a status PDU from the receiving side. Since the PDUs acknowledged through the received status PDU are removed from the retransmission buffer, the buffer occupancy rate of the retransmission buffer is reduced.

Figure 9:
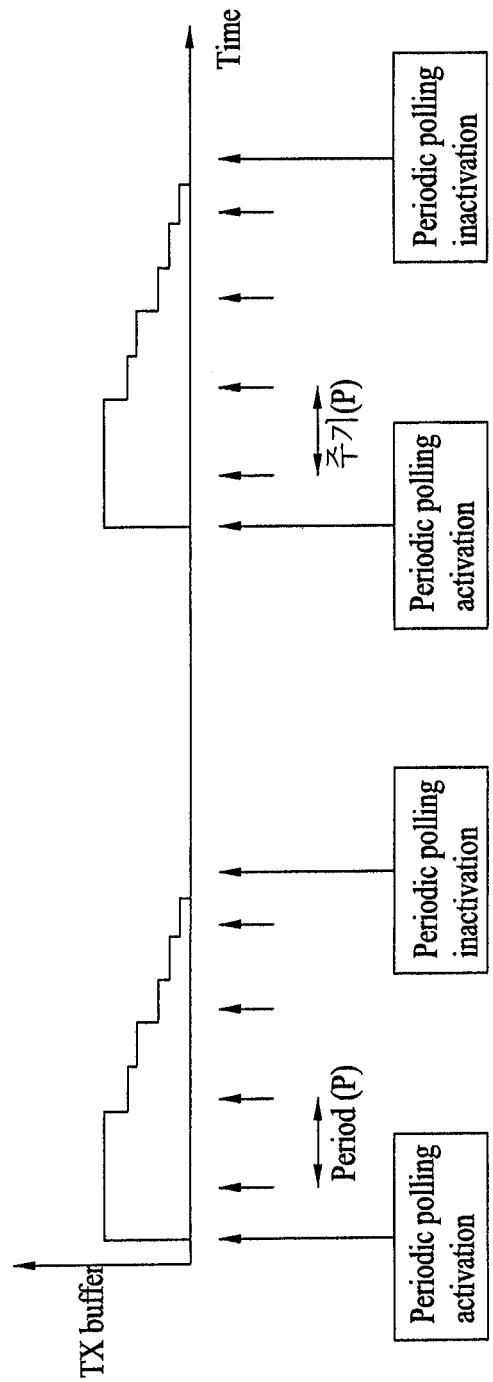
FIG. 9 is a diagram illustrating other embodiment of the present invention.

FIG. 9 is a diagram illustrating another embodiment of the present invention.

According to the embodiment of FIG. 9, if a predetermined event occurs in an RLC layer of a transmitting side, the RLC layer periodically performs a polling procedure, and terminates the polling procedure if a certain condition is satisfied.

Referring to FIG. 9, if a predetermined event occurs, for example, if data stored in a transmission buffer or a retransmission buffer or data stored in both the transmission buffer and the retransmission buffer reaches a value greater than a first reference value, the RLC layer of the transmitting side activates the periodic polling procedure. In other words, the RLC layer repeatedly performs the polling procedure per polling period (P) which is previously determined. If the transmission buffer or the retransmission buffer is empty or if both the transmission buffer and the retransmission buffer are empty, during the periodic polling procedure, the RLC layer stops the polling procedure. Even though the data stored in at least one of the transmission buffer and the retransmission buffer reach a value smaller than the second reference value, the RLC layer may stop the periodic polling procedure.

In the embodiment of FIG. 9, the RLC layer can variably set the polling period in accordance with the buffer status. For example, if the buffer occupancy rate for the transmission buffer or the retransmission buffer is greater than a threshold value, which is previously set, a short polling period can be set. If the buffer occupancy rate for the transmission buffer or the retransmission buffer is less than a threshold value, which is previously set, a long polling period can be set. Also, in a state that the periodic polling procedure is activated, the RLC layer can terminate the polling procedure after performing the polling procedure as much as the number of times, which is previously determined. Information, which activates or inactivates the periodic polling procedure, such as types of events, first and second reference values, threshold value, polling period, and the number of polling times, can be transferred to the transmitting side and the receiving side during call establishment or radio bearer (RB) establishment.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of performing a polling procedure in a protocol layer performing a data retransmission function in a transmitting side in a wireless communication system, the method comprising:
    triggering a polling procedure to request a receiving side to transmit a status report, the status report reporting whether at least one data block transmitted from the transmitting side has been successfully received by the receiving side;
    setting a polling bit of a data block as a polling request bit; and
    cancelling the triggered polling procedure in case that the status report is received from receiving side before transmitting the polling bit to the receiving side,
    wherein in the polling procedure, the protocol layer stores a sequence number of a specific data block for which a reception acknowledgement is desired by the transmitting side, and
    wherein the triggered polling procedure is canceled when transmitting side receives the status report in a state that radio resources for uplink data transmission is not allocated after the polling procedure is triggered and the status report includes the reception acknowledgement for the specific data block.

2. The method of claim 1, wherein the protocol layer is a radio link control (RLC) layer.

3. The method as in claims 1, wherein the polling procedure is triggered at least one of the following states:
    when a polling period of periodic polling procedure comes after the protocol layer transmits the last data stored therein to the receiving side;
    when a timer for the polling procedure expires; and
    when a ratio of data stored in a buffer of the transmitting side to maximum data that can be stored in the buffer exceeds a first reference value.

4. The method as in claims 1, wherein the transmitting side is user equipment and the receiving side is a base station.

5. The method of claim 3, wherein the buffer is a transmission buffer or a retransmission buffer.

6. The method of claim 5, wherein the polling procedure is periodically performed after it is triggered.

7. The method of claim 6, wherein the polling procedure is terminated if an amount of data stored in the buffer is less than a second reference value.

8. The method of claim 7, wherein the polling period is variably set in accordance with the amount of data stored in the buffer.

* * * * *